(12) United States Patent
Kasher

(10) Patent No.: US 10,547,473 B2
(45) Date of Patent: Jan. 28, 2020

(54) TECHNIQUES FOR PERFORMING MULTIPLE-INPUT AND MULTIPLE-OUTPUT TRAINING USING A BEAM REFINEMENT PACKET

(71) Applicant: INTEL IP CORPORATION, Santa Clara, CA (US)

(72) Inventor: Assaf Kasher, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/948,291

(22) Filed: Apr. 9, 2018

(65) Prior Publication Data

US 2019/0081819 A1 Mar. 14, 2019

Related U.S. Application Data

(63) Continuation of application No. 14/866,886, filed on Sep. 26, 2015, now Pat. No. 9,942,060.

(60) Provisional application No. 62/200,019, filed on Aug. 1, 2015.

(51) Int. Cl.
| | |
|---|---|
| H04L 25/02 | (2006.01) |
| H04J 13/12 | (2011.01) |
| H04J 13/00 | (2011.01) |
| H04B 7/06 | (2006.01) |
| G01S 15/89 | (2006.01) |
| H04B 7/08 | (2006.01) |

(52) U.S. Cl.
CPC ...... *H04L 25/0202* (2013.01); *G01S 15/8959* (2013.01); *H04B 7/0695* (2013.01); *H04B 7/086* (2013.01); *H04J 13/0011* (2013.01); *H04J 13/0014* (2013.01); *H04J 13/12* (2013.01); *H04L 25/0226* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,160,382 | B2* | 10/2015 | Wu | H04B 1/1027 |
| 9,442,182 | B2* | 9/2016 | Morita | G01S 7/2813 |
| 9,912,786 | B2* | 3/2018 | Yosoku | H04L 1/0063 |
| 2009/0109952 | A1* | 4/2009 | Lakkis | H04B 1/69 370/349 |
| 2009/0238240 | A1* | 9/2009 | Lakkis | H04L 25/03057 375/130 |
| 2012/0207192 | A1* | 8/2012 | Zhang | H04J 13/102 375/135 |
| 2012/0207231 | A1* | 8/2012 | Zhang | H04L 27/2613 375/260 |
| 2012/0309325 | A1* | 12/2012 | Carbone | H04B 1/40 455/73 |
| 2014/0086229 | A1* | 3/2014 | Yosoku | H04L 1/0063 370/338 |

(Continued)

*Primary Examiner* — Linda Wong

(57) ABSTRACT

Various embodiments are generally directed to an apparatus, method and other techniques to perform beamforming training in a MIMO environment. Some embodiments may include communicating one or more beamforming refinement packets having training subfields with orthogonal structures such that devices may simultaneously perform beamforming training for each pair of phased array antennas. Embodiments may also include the beamforming refinement packets with channel estimation fields with orthogonal structures.

22 Claims, 10 Drawing Sheets

(56) References Cited

U.S. PATENT DOCUMENTS

| | | | |
|---|---|---|---|
| 2014/0314137 A1* | 10/2014 | Lakkis | H04L 25/03006 375/232 |
| 2015/0098535 A1* | 4/2015 | Wu | H04B 1/1027 375/350 |
| 2016/0192363 A1* | 6/2016 | Kasher | H04L 5/00 370/329 |
| 2016/0241314 A1* | 8/2016 | Ferrante | H04W 72/0406 |

* cited by examiner

TECHNIQUES FOR PERFORMING MULTIPLE-INPUT AND MULTIPLE-OUTPUT TRAINING USING A BEAM REFINEMENT PACKET

RELATED CASE

This application is a continuation of, claims the benefit of and priority to, previously filed U.S. patent application Ser. No. 14/866,886 entitled "TECHNIQUES FOR PERFORMING MULTIPLE-INPUT AND MULTIPLE-OUTPUT TRAINING USING A BEAM REFINEMENT PACKET" filed on Sep. 26, 2015, which claims priority to U.S. Provisional Patent Application No. 62/200,019, filed Aug. 1, 2015, the subject matter of which are hereby incorporated herein by reference in their respective entireties.

TECHNICAL FIELD

Embodiments described herein generally relate techniques to perform beamforming refinement.

BACKGROUND

Wireless communication systems communicate information over a shared wireless communication medium such as one or more portions of the radio-frequency (RF) spectrum. Recent innovations in Millimeter-Wave (mmWave) communications operating at the 60 Gigahertz (GHz) frequency band promises several Gigabits-per-second (Gbps) throughput. The next generation 60 GHz standard may be applied to new applications, such as outdoor access and backhaul. These new applications may require longer ranges, e.g. 100 meters (m), than what is currently being used. These longer ranges may require directional transmissions to achieve the desired rates. Phased array antennas are frequently used to achieve high gain in a desired direction to achieve these rates. In order to set the correct antenna weight vectors (AWV) at the phased arrays of communications stations a beamforming process may be required.

DETAILED DESCRIPTION

Figure 1:
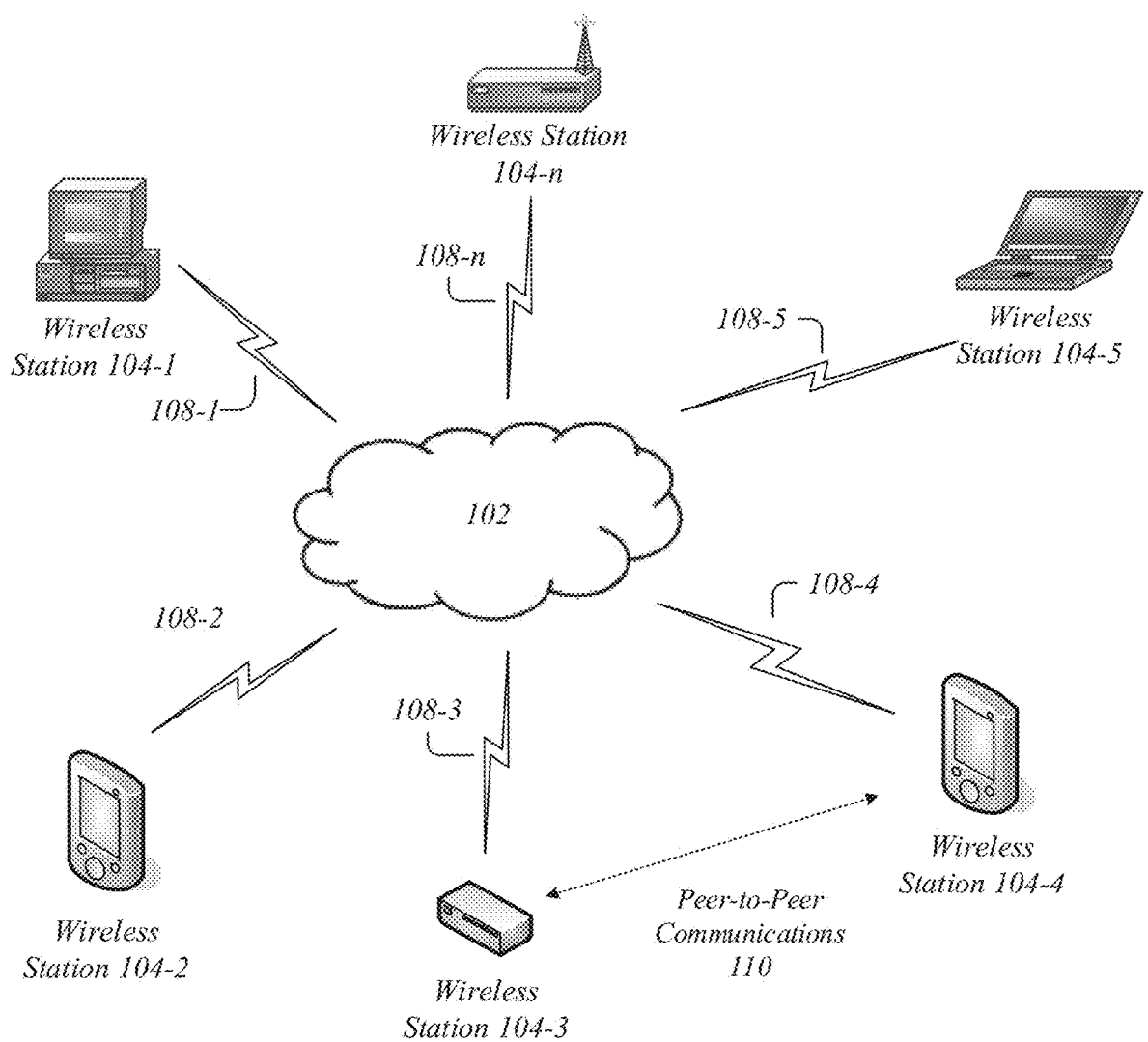
FIG. 1 illustrates an example embodiment of a computing system.

Various embodiments are generally directed to techniques for operation in accordance with one or more specification, standards or variants suitable for wireless communications. For example, various embodiments may include communications in and around the 60 Gigahertz (GHz) frequency band as defined by Wireless Gigabit Alliance Wireless Gigabit ("WiGig") Specification Version 1.0, according to Institute of Electrical and Electronics Engineers (IEEE) Standard 802.11ad-2012, published December 2012, titled "Amendment 3: Enhancements for Very High Throughput in the 60 GHz Band," ("IEEE 802.11ad-2012") or according to any predecessors, revisions, or variants thereof (collectively, "WiGig/802.11ad Standards"). Embodiments may also operate in accordance with one or more of the WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations. Further, some embodiments may be directed for operation in accordance with the next generation (NG) 60 GHz communication standard, such as IEEE 802.11ay Next Generation 60 GHz (hereinafter "NG60") or any other wireless standards as promulgated by other standards organizations. Various embodiments are not limited in this manner.

As previously discussed, communication in the 60 GHz range may require directional transmissions to achieve the required communication rates at desired distances. These devices or stations operating in the 60 GHz may include one or more phased array antennas to achieve high gain to support directional communication. In order to set the correct weight vector (AWV) for the phased array antennas of both the transmitter and receiver on each side of the communication link beamforming training may be performed. For example, a beamforming refinement packet (BRP) format may include a number of training fields, each used to train different AWVs for both a transmitter and a receiver.

In some embodiments, a station may communicate with a number of other stations using multiple-input and multiple-output (MIMO) techniques by using multiple transmit (TX) and multiple receive (RX) phased array antennas to exploit multipath propagation. Each of these TX and RX phased array antennas will require training. Thus, as will be discussed in more detail below, various embodiments include using a BRP format to simultaneously train each pair of MIMO phased array antennas. Some embodiments may include communicating one or more BRP packets having training subfields with orthogonal structures to simultaneously perform the beamforming training for each pair of phased array antennas. Embodiments may also include the BRP packets having channel estimation fields with orthogonal structures. Various details are discussed herein.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram of one embodiment of a communications system 100. In various embodiments, the communications system 100 may include multiple stations or devices. A station generally may include any physical or logical entity for communicating information in the communications system 100 and may be implemented as hardware, software, or any combination thereof, as desired for a given set of design parameters or performance constraints. Although FIG. 1 may show a limited number of stations by way of example, it can be appreciated that more or less stations may be employed for a given implementation.

In various embodiments, the communications system 100 may include, or form part of a wired communications system, a wireless communications system, or a combination of both. For example, the communications system 100 may include one or more stations arranged to communicate information over one or more types of wired communication links. Examples of a wired communication link, may include, without limitation, a wire, cable, bus, printed circuit board (PCB), Ethernet connection, peer-to-peer (PTP) connection, backplane, switch fabric, semiconductor material, twisted-pair wire, co-axial cable, fiber optic connection, and so forth. The communications system 100 also may include one or more stations arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices including part of the communications system 100 may be arranged to operate in accordance with any specification or standards, such as the WiGig/802.11ad Standards, Wi-Fi Standards, NG60 Standard, and so forth.

Further, the communications system 100 may communicate, manage, or process information in accordance with one or more protocols. A protocol may include a set of pre-defined rules or instructions for managing communication among stations. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. The embodiments are not limited in this context.

As shown in FIG. 1, the communications system 100 may include a network 102 and a plurality of wireless stations 104-$n$, where n may represent any positive integer value. In various embodiments, the wireless stations 104-$n$ may be implemented as various types of wireless devices. Examples of wireless devices may include, without limitation, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, media server, digital music player, set-top box (STB), appliance, workstation, user terminal, mobile unit, consumer electronics, television, digital television, high-definition television, television receiver, high-definition television receiver, and so forth. In the illustrated embodiment shown in FIG. 1, the wireless stations 104-$n$ may include a PC 104-1, a digital TV 104-2, a media source 104-3 (e.g., a CD, DVD, media file server, etc.), a handheld device 104-4, and a laptop or notebook 104-5. These are merely a few examples, and the embodiments are not limited in this context.

In some embodiments, the wireless stations 104-$n$ may include one more wireless interfaces and/or components for wireless communication such as one or more transmitters, receivers, transceivers, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a microstrip antenna, a diversity antenna, a dual antenna, an antenna array, a phased array antenna, and so forth.

Figure 2:
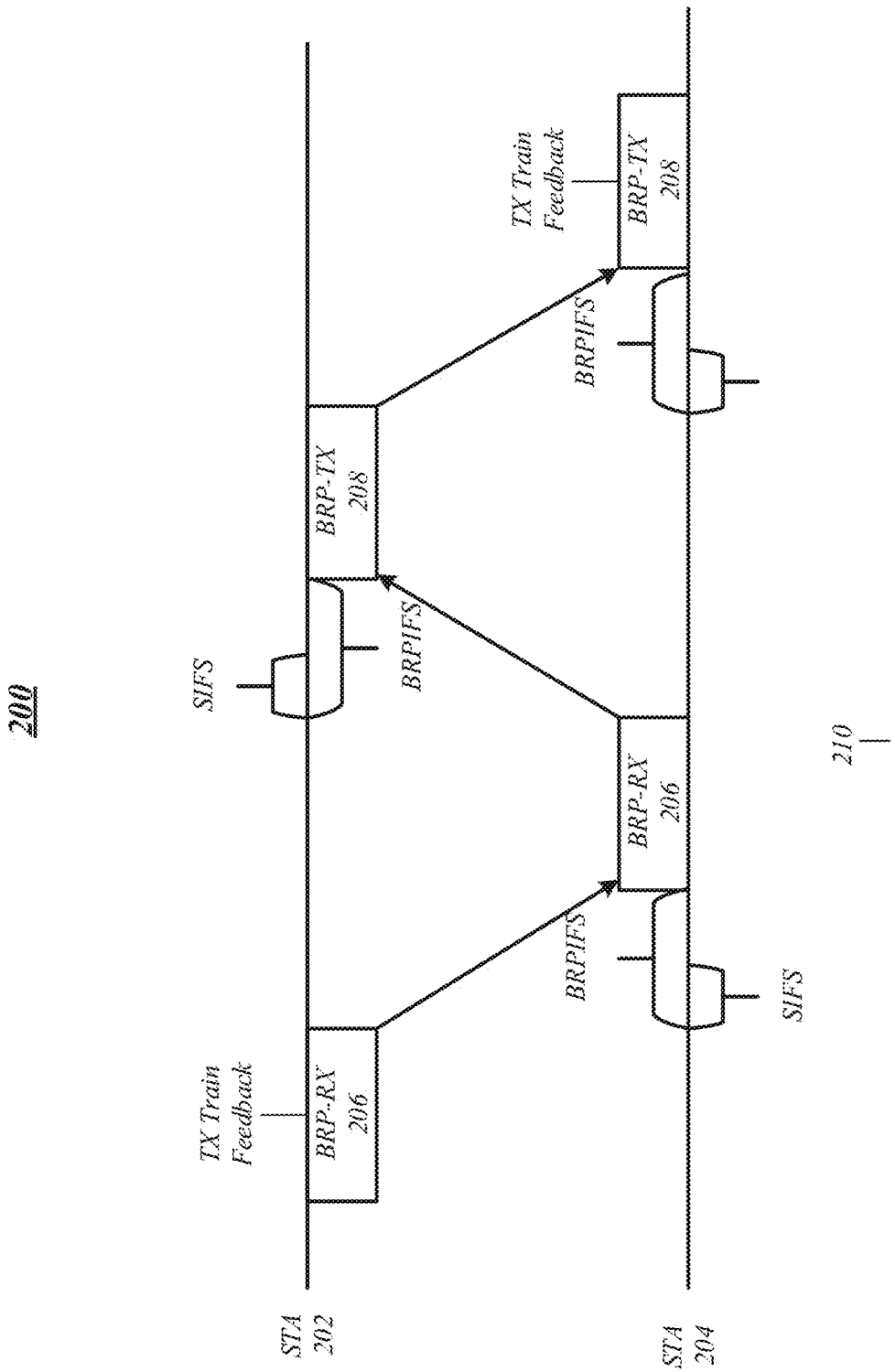
FIG. 2 illustrates an example embodiment of a beamforming refinement sequence.

FIG. 2 illustrates an example embodiment of a beamforming refinement phase 200 of a beamforming training process. In embodiments, the initiating STA 202 and responding STA 204 may communicate BRPs including training sequences, and provide feedback to determine AWVs for the phase array antennas. During the beamforming refinement phase 200, STA 202 and STA 204 may transmit and receive training sequences in order to train their phased array antennas. In some embodiments, the receiver is trained first and then the transmitter is trained. For example, the initiating STA 202 may communicate a BRP-RX packet 206 that contains training fields and sequences to enable the responding STA 204 to train its phased array antennas. The responding STA 204 may communicate a BRP-RX packet 206 that contains training fields and sequences to enable the initiating STA 202 to train its phased array antennas.

The initiating STA 202 and responding STA 204 can also communicate BRP-TX packets 208 that contain training fields and sequences in which the transmitter of the sending station switches antenna patterns and the receiving station sends feedback in a closed-loop feedback process. The closed-loop feedback process may include channel measurements fed back to the transmitting station to allow the transmitter to weigh the antenna elements. One or more iterations may be performed to determine initial AWVs and to progressively adjust the AWVs until a predetermined signal quality between STA 202 and STA 204 is achieved. In some embodiments, the closed-loop feedback process may include sending weights to the transmitting station. In some embodiments, this beamforming refinement phase 200 may be iterated as indicated by arrow 210.

Figure 3:
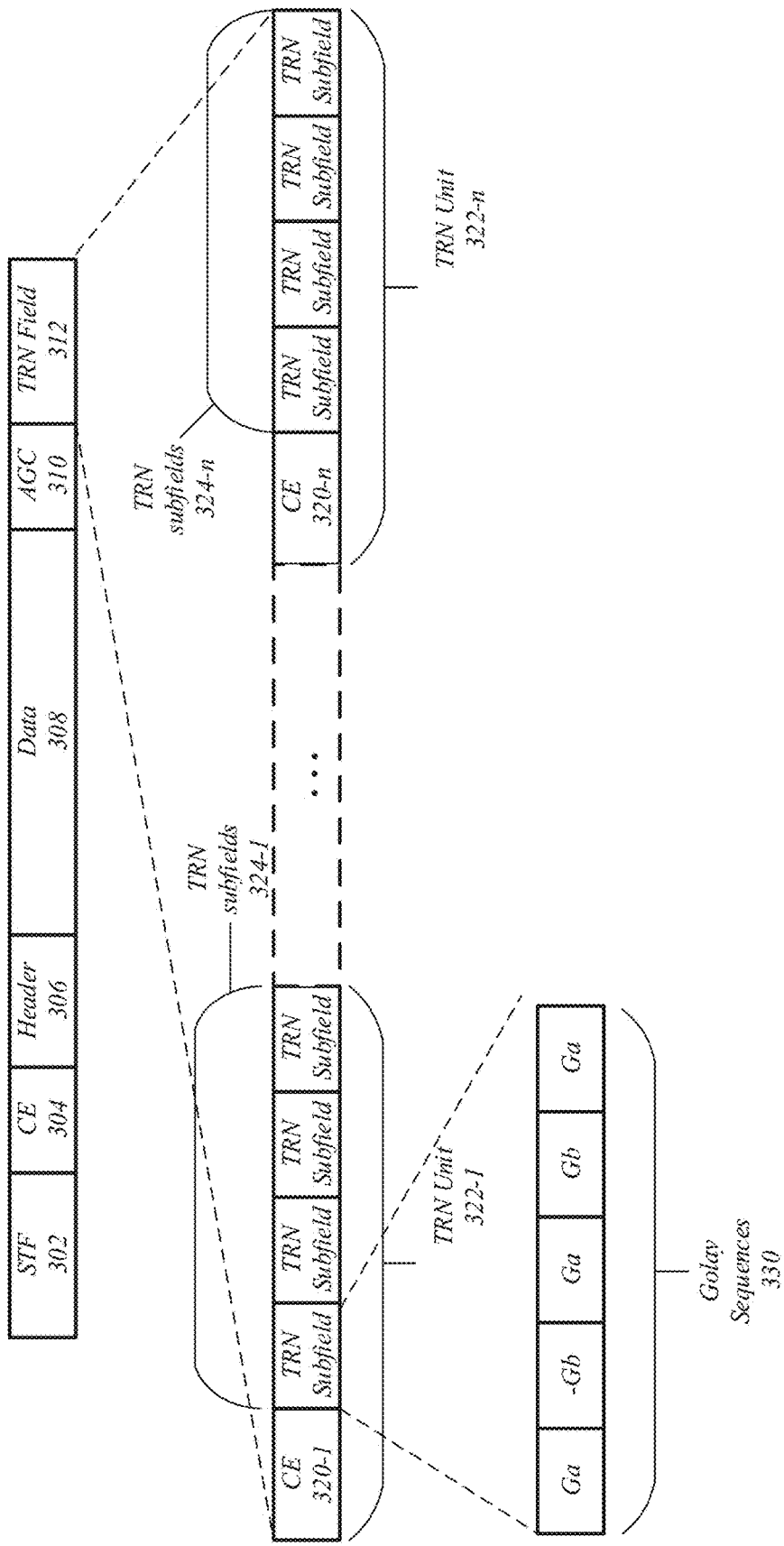
FIG. 3 illustrates an example embodiment of a beamforming refinement packet.

FIG. 3 illustrates an example embodiment of a BRP 300 that may be used during a beamforming refinement process. The BRP 300 may include a number of fields, including a short training field (STF) 302, a channel estimation field (CE) 304, a header 306, and data 308 in the preamble of the BRP 300. These fields may include information that supports the receiver during automatic gain control (AGC), recognizing the packet, and estimating the frequency offset. In some embodiments, the header 306 may also indicate the existence and length of the AGC field 310, and the training (TRN) field 312 which may be appended to the BRP 300.

In embodiments, the TRN field 312 may include any number of TRN Units 322-$n$, where n may be any positive integer and include beamforming information and sequences. Each TRN unit 322 may include a CE field 320-$n$ and four TRN subfields 324-$n$. The CE field 320 for each TRN unit 322 may be communicated via the same antenna that was used to transmit the STF field 302, the CE field 304, and the Data 308.

The CE field 320 and TRN subfield 324 are made up of a number or set of Golay sequences which consists of bipolar symbols (±1). For example, a TRN subfield may include a set of Golay sequences 330, as illustrated in FIG. 3. The Golay sequences are conducted in order to achieve specific auto-correlation characteristics, consist of complementary pair (a and b), and are of a specified length such as 128 symbols. During beamforming training a transmitter of a STA may change the antenna pattern at the beginning of each TRN subfield (e.g. the first Golay sequence) while transmit training. In addition, a receiver may change the antenna pattern at the beginning of each TRN subfield (e.g. the first Golay sequence) while receive training. However, embodiments are not limited in this manner.

Figure 4:
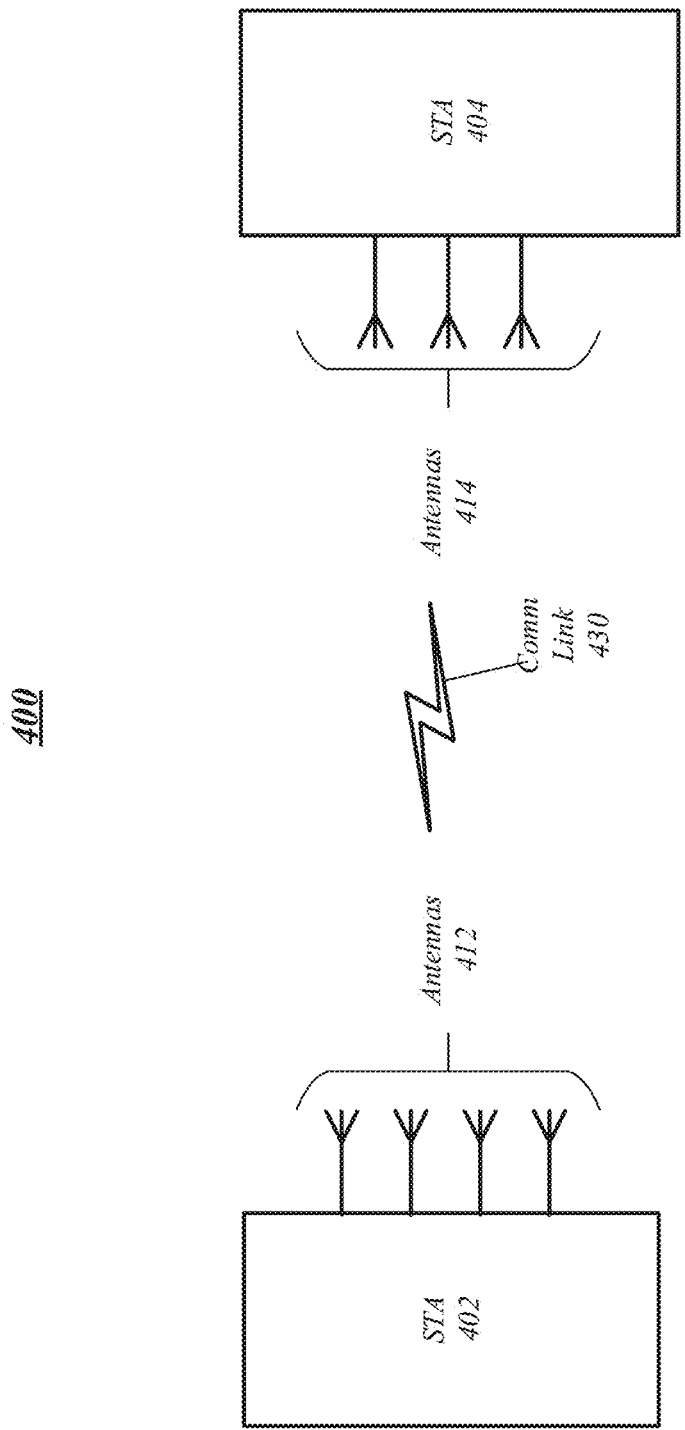
FIG. 4 illustrates an example embodiment communication system.

FIG. 4 illustrates an example embodiment of a communication system 400 which illustrates communications between two stations, STA 402 and STA 404. These STAs 402 and 404 may be the same as or similar to the STAs discussed above with respect to FIG. 2. In embodiments, each of the STAs 402 and 404 may communicate in the communication system 400 using MIMO techniques. Thus, each of the STAs 402 and 404 may include a number of antennas. For example, STA 402 is illustrated as having four antennas 412, which may be phased array antennas. Further, STA 404 is illustrated as having three antennas 414, which may also be phased array antennas. Although FIG. 4 illustrates the STAs 402 and 404 having a specific number of antennas, various embodiments are not limited in this manner.

The STAs 402 and 404 may establish and communicate with each other via the communication link 430. When establishing the communication link 430, the STAs 402 and 404 may perform beamforming training which may include a beamforming refinement process. During the beamforming refinement process, one or more BRP packets, such as BRP 300, may be communicated between the STAs 402 and 404. In embodiments, a known antenna pattern (e.g. Golay sequence) may be communicated from each transmit antenna to each receiver antenna. Since the receive antennas (on either STA 402 or 404) can receive simultaneously, they can be trained simultaneously and using the same BRP packets.

Various embodiments include using BRP packets that have TRN subfields with training sequences in an orthogonal structure such that a receiving antenna and receiver that receives the BRP packets simultaneously can train and separate out the sequences. In other words, AWVs may be determined for each receiving antenna using the same BRP packets simultaneously or substantially at the same time. The orthogonal structure may be created for each TRN subfield by multiplying at least some of the Golay sequences in the TRN subfield by a unitary matrix. In some embodiments, the first Golay sequence in a TRN subfield may be used as a cyclic prefix and for antenna switching, and therefore may not be part of the orthogonal sequence. As will be discussed in more detail below, the remaining Golay sequences can be used to generate the orthogonal structure.

Figure 5:
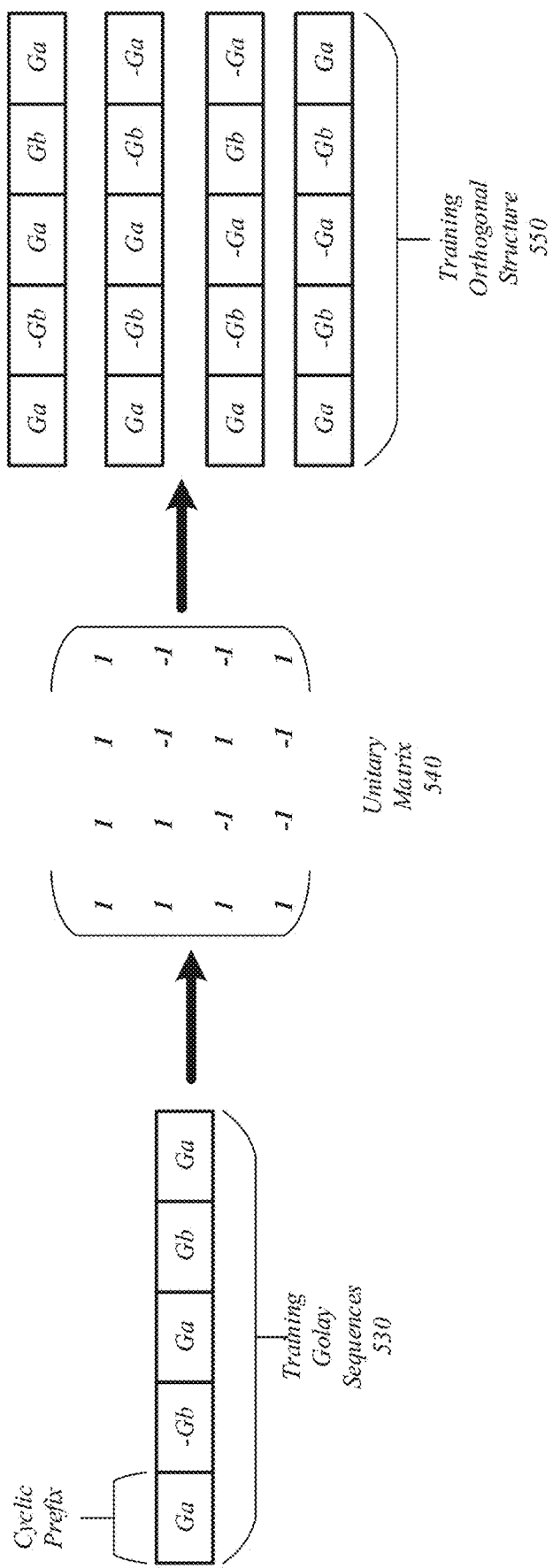
FIG. 5 illustrates an example embodiment of a process flow.

FIG. 5 illustrates an example embodiment of a processing flow 500 for generating an orthogonal structure for training receiving antennas and receivers simultaneously. As previously mentioned in FIG. 3, each TRN subfield may include a number of Golay sequences. FIG. 3 illustrates a TRN subfield having five Golay sequences. This same set of Golay sequences is illustrated in FIG. 5 as Golay sequences 530 as an example for generating a training orthogonal structure 550. Various embodiments are not limited to this example and a set of Golay sequences may be in any combination.

As previously mentioned, the first Golay sequence in the set of Golay sequences 530 may be used as a cyclic prefix and may not be changed during the generation of the training orthogonal structure 550. The remaining four Golay sequences of the set of Golay sequences 530 may be processed by multiplying the four Golay sequences by a unitary matrix 540. Although FIG. 5 illustrates a specific unitary matrix 540, various embodiments are not limited in this manner and any unitary matrix with unit amplitude elements can be used.

The training orthogonal structure 550 can include an orthogonal matrix of sets of Golay sequences. The training orthogonal structure 550 can be communicated during the beamforming refinement process in one or more BRPs. For example, each phased array antenna, such as those antennas 412 and/or 414 illustrated in FIG. 4, may transmit one or more BRP packets having the training orthogonal structure 550 appended to the end of the packet to the receiving antennas and receivers. By transmitting a BRP packet including the training orthogonal structure 550 each of the receiving antennas and receivers may be simultaneously beamformed in a MIMO environment. The orthogonal structure 550 may allow for a receiving antenna to be beamformed by integrating over the subfield using one of the sequences in the training orthogonal structure 550 while nulling contributions from the other sequences, for example.

Figure 6:
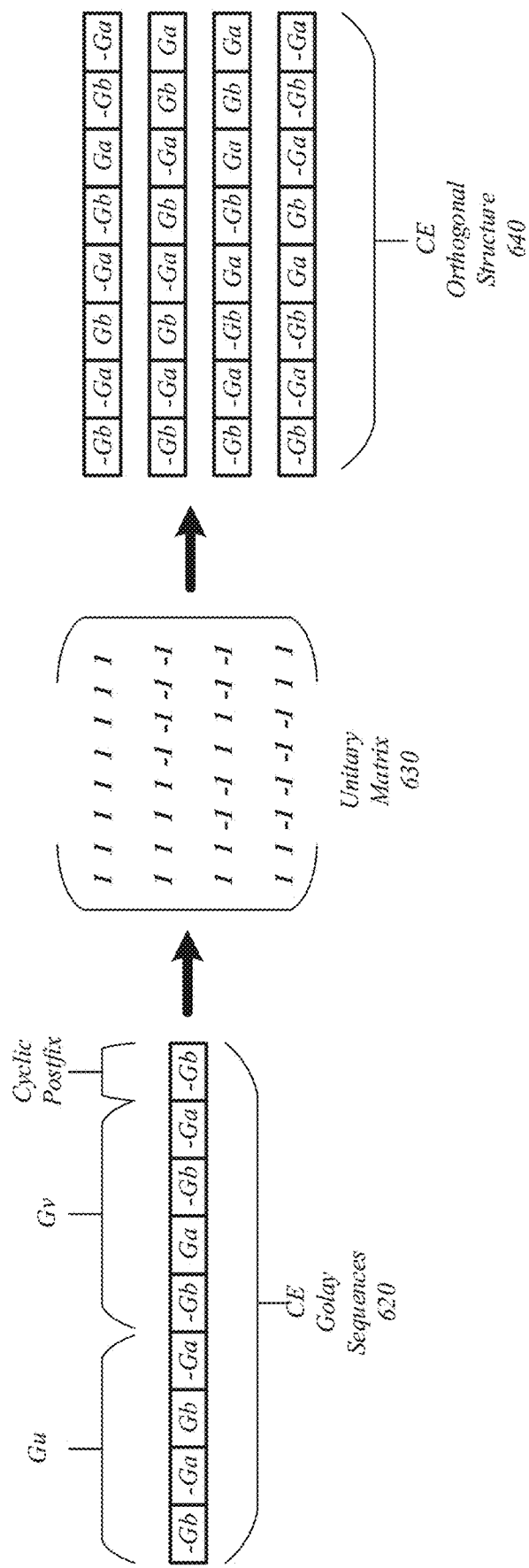
FIG. 6 illustrates an example embodiment of second process flow.

FIG. 6 illustrates an example embodiment of a processing flow 600 to generate an orthogonal structure based on the CE field in a TRN unit. In some embodiments, the CE field, such as CE field 320 illustrated in FIG. 3, may be used in a manner that requires separation between channels. As such, a CE field may be orthogonalized.

In some embodiments, the CE Golay sequences 620 in a CE field may include nine Golay sequences. However, embodiments are not limited in this manner. The last Golay sequence in the CE Golay sequences 620 may be a cyclic postfix. The remaining Golay sequences may be divided into two groups, Gu and Gv, and multiplied by a unitary matrix 630 to generate the CE orthogonal structure 640. The CE orthogonal structure 640 may be communicated with each TRN subfield and/or the training orthogonal structure 550 previously discussed above during a beamforming refinement process.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
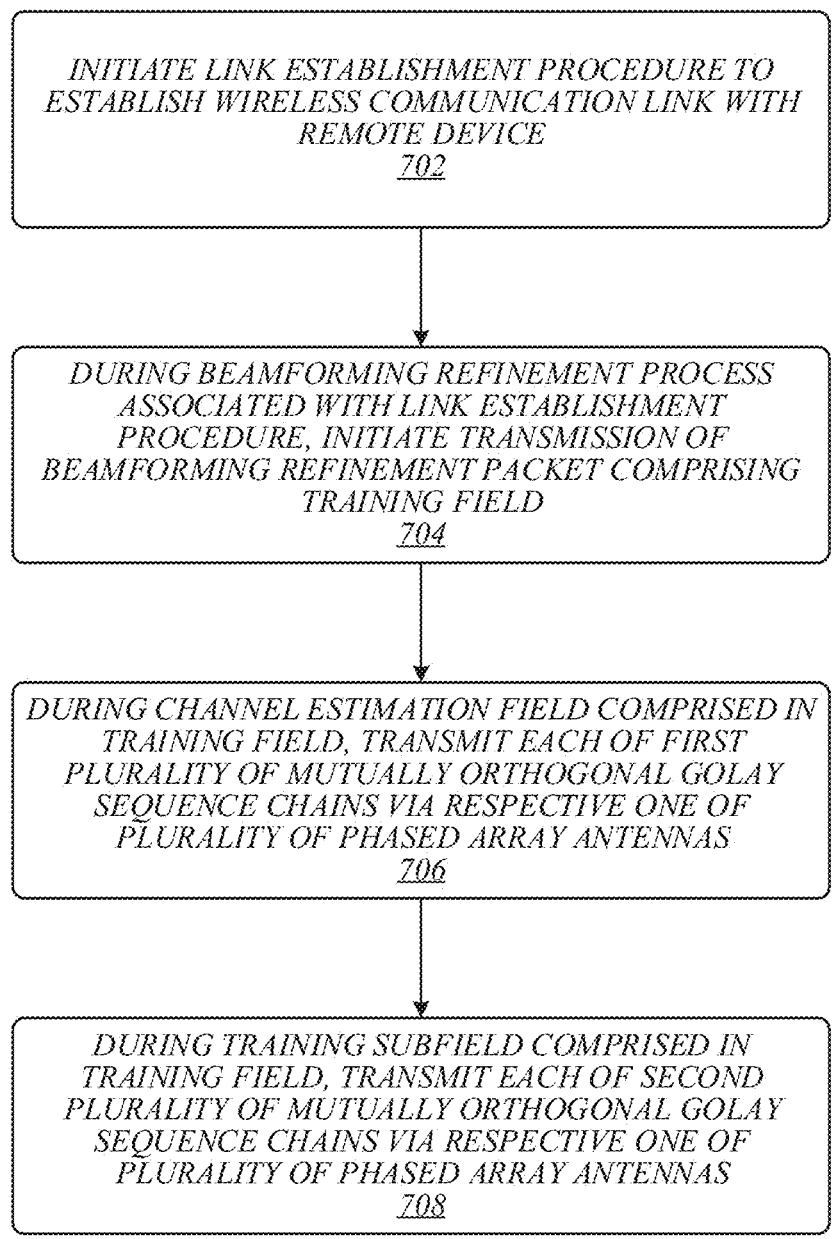
FIG. 7 illustrates an example embodiment of a logic flow.

FIG. 7 illustrates an example of a logic flow 700, which may be representative of one or more of the disclosed techniques according to various embodiments. For example, logic flow 700 may be representative of operations that may be performed in some embodiments by STA 402 in communication system 400 of FIG. 4. As shown in FIG. 7, a link establishment procedure may be initiated at 702 in order to establish a wireless communication link with a remote device. For example, in communication system 400 of FIG. 4, STA 402 may be operative to initiate a link establishment procedure to establish communication link 430 with STA 404. At 704, during a beamforming refinement process associated with the link establishment procedure, transmission of a beamforming refinement packet may be initiated, and the beamforming refinement packet may comprise a training field. For example, in communication system 400 of FIG. 4, STA 402 may be operative to initiate transmission of a beamforming refinement packet to STA 404, and the beamforming refinement packet may comprise a same or similar structure as beamforming refinement packet 300 of FIG. 3, according to which it may contain a training (TRN) field 312.

At 706, during a channel estimation field comprised in the training field of the beamforming refinement packet, each of a first plurality of mutually orthogonal Golay sequence chains may be transmitted via a respective one of a plurality of phased array antennas. For example, during the channel estimation (CE) field 320-1 comprised in the TRN field 312 of beamforming refinement packet 300 of FIG. 3, STA 402 of FIG. 4 may transmit each of the four mutually orthogonal Golay sequence chains comprised in CE orthogonal structure 640 of FIG. 6 via a respective one of four phased array antennas 412. At 708, during a training subfield comprised in the training field of the beamforming refinement packet, each of a second plurality of mutually orthogonal Golay sequence chains may be transmitted via a respective one of a plurality of phased array antennas. For example, during a training subfield 324-1 comprised in the TRN field 312 of beamforming refinement packet 300 of FIG. 3, STA 402 of FIG. 4 may transmit each of the four mutually orthogonal Golay sequence chains comprised in training orthogonal structure 550 of FIG. 5 via a respective one of four phased array antennas 412. It is worthy of note that in various embodiments, mutually orthogonal Golay sequence chains may be used for training subfields but not for CE fields, and thus the operations at 706 may not be performed. Likewise, in some embodiments, mutually orthogonal Golay sequence chains may be used for CE fields but not for training subfields, and thus the operations at 708 may not be performed. The embodiments are not limited in this context.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 8:
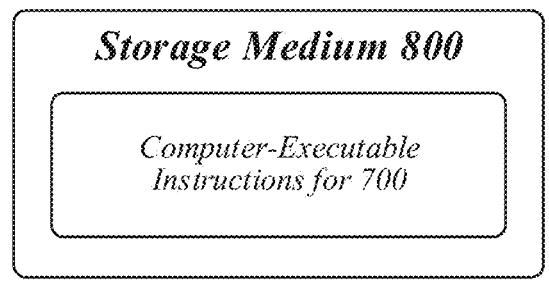
FIG. 8 illustrates an example embodiment of a storage medium.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions that may be read and executed by one or more processors to enable performance of the operations described herein. For example, in various embodiments, storage medium 800 may store computer-executable instructions that may be read and executed by one or more processors to enable performance of operations associated with logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
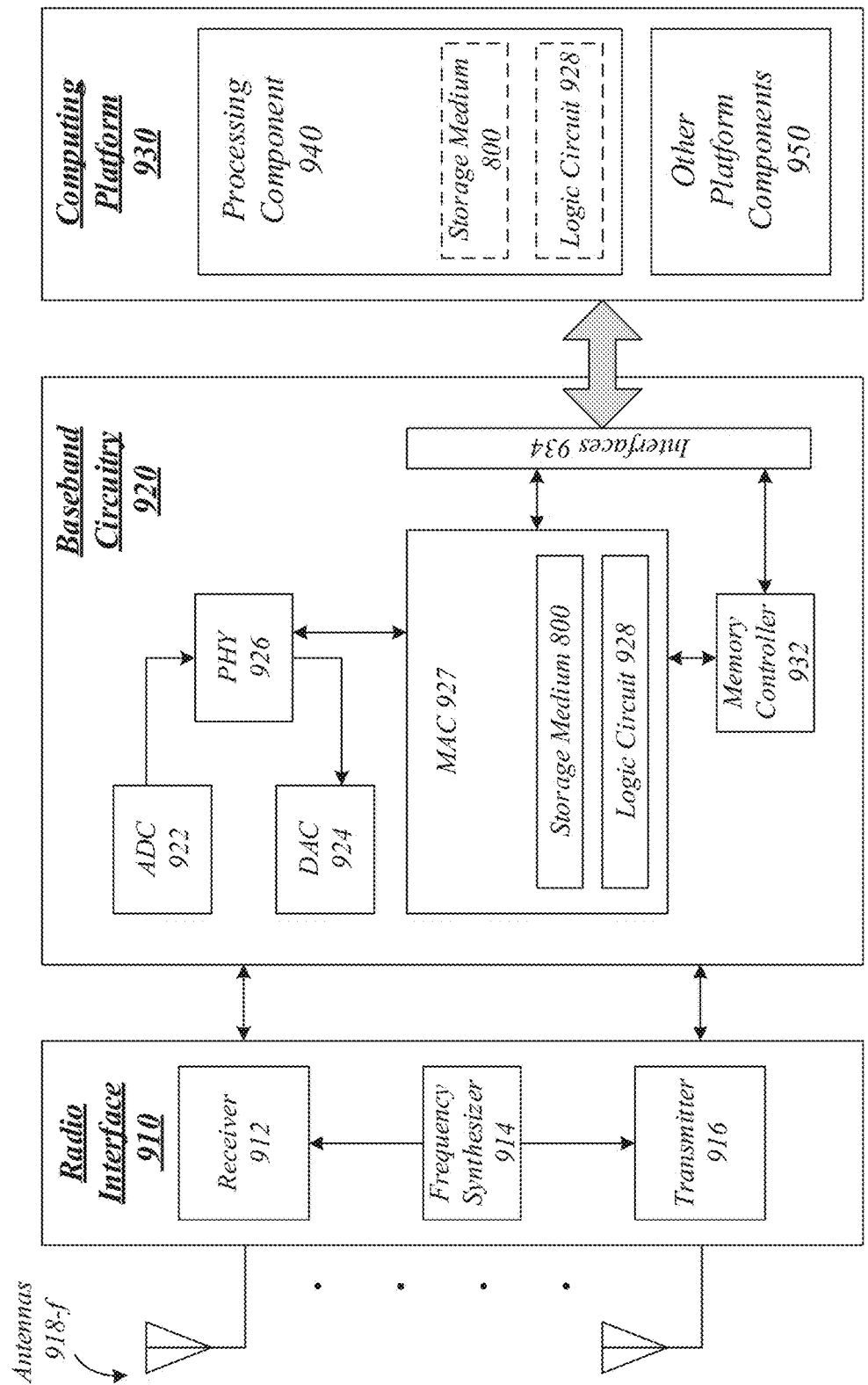
FIG. 9 illustrates an example embodiment of a computing architecture.

FIG. 9 illustrates an embodiment of a communications device 900 that may implement one or more of STAs 402 and 404 of FIG. 4, logic flow 700 of FIG. 7, and storage medium 800 of FIG. 8. In various embodiments, device 900 may comprise a logic circuit 928. The logic circuit 928 may include physical circuits to perform operations described for one or more of STAs 402 and 404 of FIG. 4 and logic flow 700 of FIG. 7, for example. As shown in FIG. 9, device 900 may include a radio interface 910, baseband circuitry 920, and computing platform 930, although the embodiments are not limited to this configuration.

The device 900 may implement some or all of the structure and/or operations for one or more of STAs 402 and 404 of FIG. 4, logic flow 700 of FIG. 7, storage medium 800 of FIG. 8, and logic circuit 928 in a single computing entity, such as entirely within a single device. Alternatively, the device 900 may distribute portions of the structure and/or operations for one or more of STAs 402 and 404 of FIG. 4, logic flow 700 of FIG. 7, storage medium 800 of FIG. 8, and logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-*f*. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals.

Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of STAs 402 and 404 of FIG. 4, logic flow 700 of FIG. 7, storage medium 800 of FIG. 8, and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-*f*) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
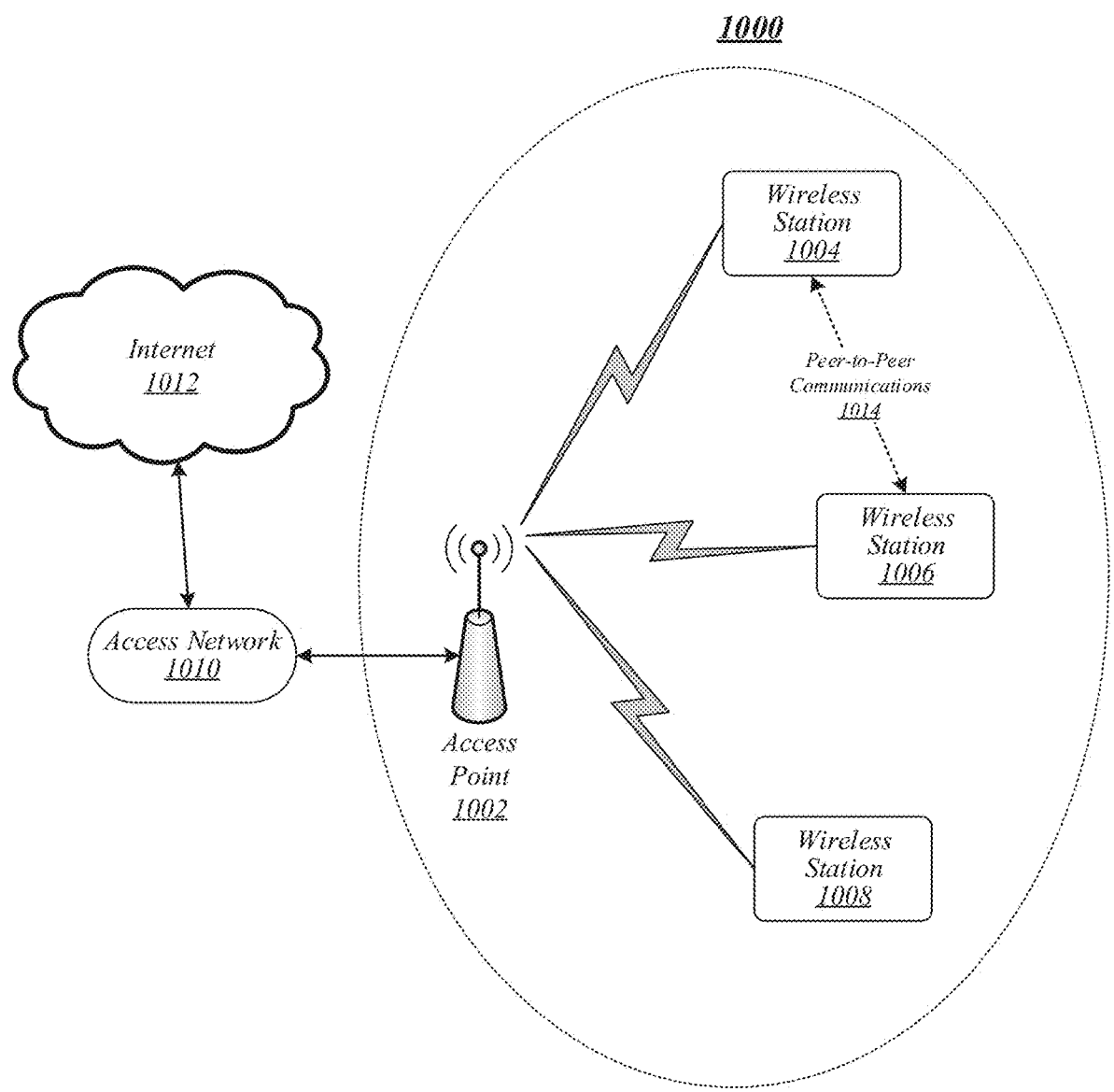
FIG. 10 illustrates an example embodiment of a wireless network.

FIG. 10 illustrates an embodiment of a wireless network 1000. As shown in FIG. 10, wireless network comprises an access point 1002 and wireless stations 1004, 1006, and 1008. In various embodiments, wireless network 1000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1000 may comprise another type of wireless network, and/or may implement other wireless communications standards. In various embodiments, for example, wireless network 1000 may comprise a WWAN or WPAN rather than a WLAN. The embodiments are not limited to this example.

In some embodiments, wireless network 1000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1004, 1006, and 1008 may communicate with access point 1002 in order to obtain connectivity to one or more external data networks. In some embodiments, for example, wireless stations 1004, 1006, and 1008 may connect to the Internet 1012 via access point 1002 and access network 1010. In various embodiments, access network 1010 may comprise a private network that provides subscription-based Internet-connectivity, such as an Internet Service Provider (ISP) network. The embodiments are not limited to this example.

In various embodiments, two or more of wireless stations 1004, 1006, and 1008 may communicate with each other directly by exchanging peer-to-peer communications. For example, in the example of FIG. 10, wireless stations 1004 and 1006 communicate with each other directly by exchanging peer-to-peer communications 1014. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising at least one memory, and logic, at least a portion of which is in hardware, the logic to generate a plurality of Golay sequence chains, each of the plurality of Golay sequence chains to be encoded for transmission by a respective one of a plurality of phased array antennas of a station (STA) during a training subfield of a beamforming refinement packet, each of the plurality of Golay sequence chains to be structured such that it is orthogonal to each other one of the plurality of Golay sequence chains.

Example 2 is the wireless communication apparatus of Example 1, each of the plurality of Golay sequence chains to comprise a respective set of four Golay sequences.

Example 3 is the wireless communication apparatus of any of Examples 1 to 2, each Golay sequence in each of the plurality of Golay sequence chains to comprise a length of 128 symbols.

Example 4 is the wireless communication apparatus of any of Examples 1 to 3, a respective type of each Golay sequence in each of the plurality of Golay sequence chains to comprise a type Ga or a type Gb.

Example 5 is the wireless communication apparatus of any of Examples 1 to 4, each of the plurality of Golay sequence chains to correspond to a respective row of a matrix comprising the product of a Golay sequence vector and a unitary matrix comprised of unit amplitude elements.

Example 6 is the wireless communication apparatus of any of Examples 1 to 5, the plurality of Golay sequence chains to comprise four Golay sequence chains, the plurality of phased array antennas to comprise four phased array antennas.

Example 7 is the wireless communication apparatus of any of Examples 1 to 6, each of the plurality of Golay sequence chains to be encoded for transmission by a respective one of the plurality of phased array antennas of the STA during each of a plurality of training subfields of a training (TRN) field of the beamforming refinement packet.

Example 8 is the wireless communication apparatus of Example 7, the logic to select a first antenna pattern for application in conjunction with transmissions of the plurality of phased array antennas during a first one of the plurality of training subfields, and select a second antenna pattern for application in conjunction with transmissions of the plurality of phased array antennas during a second one of the plurality of training subfields, the second antenna pattern to differ from the first antenna pattern.

Example 9 is the wireless communication apparatus of any of Examples 7 to 8, the TRN field to comprise the plurality of training subfields and a channel estimation (CE) field.

Example 10 is the wireless communication apparatus of Example 9, the logic to generate a second plurality of Golay sequence chains, each of the second plurality of Golay sequence chains to be encoded for transmission by a respective one of the plurality of phased array antennas of the STA during the CE field, each of the second plurality of Golay sequence chains to be structured such that it is orthogonal to each other one of the second plurality of Golay sequence chains.

Example 11 is the wireless communication apparatus of Example 10, each of the second plurality of Golay sequence chains to comprise a respective set of eight Golay sequences.

Example 12 is the wireless communication apparatus of any of Examples 10 to 11, each Golay sequence in each of the second plurality of Golay sequence chains to comprise a length of 128 symbols.

Example 13 is the wireless communication apparatus of any of Examples 10 to 12, a respective type of each Golay sequence in each of the second plurality of Golay sequence chains to comprise a type Ga or a type Gb.

Example 14 is the wireless communication apparatus of any of Examples 1 to 13, the beamforming refinement packet to include an automatic gain control (AGC) field.

Example 15 is the wireless communication apparatus of any of Examples 1 to 14, the beamforming refinement packet to include a short training field (STF).

Example 16 is the wireless communication apparatus of any of Examples 1 to 15, the beamforming refinement packet to include a channel estimation (CE) field.

Example 17 is the wireless communication apparatus of any of Examples 1 to 16, the beamforming refinement packet to include a header and a data field.

Example 18 is the wireless communication apparatus of any of Examples 1 to 17, the logic to generate the beamforming refinement packet for transmission during a beam refinement phase of a beamforming training process.

Example 19 is the wireless communication apparatus of Example 18, the beamforming training process to comprise an Institute of Electrical and Electronics Engineers (IEEE) 802.11ad-2012 beamforming process or an IEEE 802.11ay beamforming process.

Example 20 is a system, comprising a wireless communication apparatus according to any of Examples 1 to 19, and at least one radio frequency (RF) transceiver.

Example 21 is the system of Example 20, comprising at least one processor.

Example 22 is the system of any of Examples 21 to 22, comprising at least one RF antenna.

Example 23 is at least one non-transitory computer-readable storage medium comprising a set of wireless communication instructions that, in response to being executed at a station (STA), cause the STA to generate a plurality of Golay sequence chains, each of the plurality of Golay sequence chains to be encoded for transmission by a respective one of a plurality of phased array antennas of a station (STA) during a training subfield of a beamforming refinement packet, each of the plurality of Golay sequence chains to be structured such that it is orthogonal to each other one of the plurality of Golay sequence chains.

Example 24 is the at least one non-transitory computer-readable storage medium of Example 23, each of the plurality of Golay sequence chains to comprise a respective set of four Golay sequences.

Example 25 is the at least one non-transitory computer-readable storage medium of any of Examples 23 to 24, each Golay sequence in each of the plurality of Golay sequence chains to comprise a length of 128 symbols.

Example 26 is the at least one non-transitory computer-readable storage medium of any of Examples 23 to 25, a respective type of each Golay sequence in each of the plurality of Golay sequence chains to comprise a type Ga or a type Gb.

Example 27 is the at least one non-transitory computer-readable storage medium of any of Examples 23 to 26, each of the plurality of Golay sequence chains to correspond to a respective row of a matrix comprising the product of a Golay sequence vector and a unitary matrix comprised of unit amplitude elements.

Example 28 is the at least one non-transitory computer-readable storage medium of any of Examples 23 to 27, the plurality of Golay sequence chains to comprise four Golay sequence chains, the plurality of phased array antennas to comprise four phased array antennas.

Example 29 is the at least one non-transitory computer-readable storage medium of any of Examples 23 to 28, each of the plurality of Golay sequence chains to be encoded for transmission by a respective one of the plurality of phased array antennas of the STA during each of a plurality of training subfields of a training (TRN) field of the beamforming refinement packet.

Example 30 is the at least one non-transitory computer-readable storage medium of Example 29, comprising wireless communication instructions that, in response to being executed at the STA, cause the STA to select a first antenna pattern for application in conjunction with transmissions of the plurality of phased array antennas during a first one of the plurality of training subfields, and select a second antenna pattern for application in conjunction with transmissions of the plurality of phased array antennas during a second one of the plurality of training subfields, the second antenna pattern to differ from the first antenna pattern.

Example 31 is the at least one non-transitory computer-readable storage medium of any of Examples 29 to 30, the TRN field to comprise the plurality of training subfields and a channel estimation (CE) field.

Example 32 is the at least one non-transitory computer-readable storage medium of Example 31, comprising wireless communication instructions that, in response to being executed at the STA, cause the STA to generate a second plurality of Golay sequence chains, each of the second plurality of Golay sequence chains to be encoded for transmission by a respective one of the plurality of phased array antennas of the STA during the CE field, each of the second plurality of Golay sequence chains to be structured such that it is orthogonal to each other one of the second plurality of Golay sequence chains.

Example 33 is the at least one non-transitory computer-readable storage medium of Example 32, each of the second plurality of Golay sequence chains to comprise a respective set of eight Golay sequences.

Example 34 is the at least one non-transitory computer-readable storage medium of any of Examples 32 to 33, each Golay sequence in each of the second plurality of Golay sequence chains to comprise a length of 128 symbols.

Example 35 is the at least one non-transitory computer-readable storage medium of any of Examples 32 to 34, a respective type of each Golay sequence in each of the second plurality of Golay sequence chains to comprise a type Ga or a type Gb.

Example 36 is the at least one non-transitory computer-readable storage medium of any of Examples 23 to 35, the beamforming refinement packet to include an automatic gain control (AGC) field.

Example 37 is the at least one non-transitory computer-readable storage medium of any of Examples 23 to 36, the beamforming refinement packet to include a short training field (STF).

Example 38 is the at least one non-transitory computer-readable storage medium of any of Examples 23 to 37, the beamforming refinement packet to include a channel estimation (CE) field.

Example 39 is the at least one non-transitory computer-readable storage medium of any of Examples 23 to 38, the beamforming refinement packet to include a header and a data field.

Example 40 is the at least one non-transitory computer-readable storage medium of any of Examples 23 to 39, comprising wireless communication instructions that, in response to being executed at the STA, cause the STA to generate the beamforming refinement packet for transmission during a beam refinement phase of a beamforming training process.

Example 41 is the at least one non-transitory computer-readable storage medium of Example 40, the beamforming training process to comprise an Institute of Electrical and Electronics Engineers (IEEE) 802.11ad-2012 beamforming process or an IEEE 802.11ay beamforming process.

Example 42 is a wireless communication method, comprising generating, by baseband circuitry of a station (STA), a plurality of Golay sequence chains, each of the plurality of Golay sequence chains to be encoded for transmission by a respective one of a plurality of phased array antennas of the STA during a training subfield of a beamforming refinement packet, each of the plurality of Golay sequence chains to be structured such that it is orthogonal to each other one of the plurality of Golay sequence chains.

Example 43 is the wireless communication method of Example 42, each of the plurality of Golay sequence chains to comprise a respective set of four Golay sequences.

Example 44 is the wireless communication method of any of Examples 42 to 43, each Golay sequence in each of the plurality of Golay sequence chains to comprise a length of 128 symbols.

Example 45 is the wireless communication method of any of Examples 42 to 44, a respective type of each Golay sequence in each of the plurality of Golay sequence chains to comprise a type Ga or a type Gb.

Example 46 is the wireless communication method of any of Examples 42 to 45, each of the plurality of Golay sequence chains to correspond to a respective row of a matrix comprising the product of a Golay sequence vector and a unitary matrix comprised of unit amplitude elements.

Example 47 is the wireless communication method of any of Examples 42 to 46, the plurality of Golay sequence chains to comprise four Golay sequence chains, the plurality of phased array antennas to comprise four phased array antennas.

Example 48 is the wireless communication method of any of Examples 42 to 47, each of the plurality of Golay sequence chains to be encoded for transmission by a respective one of the plurality of phased array antennas of the STA during each of a plurality of training subfields of a training (TRN) field of the beamforming refinement packet.

Example 49 is the wireless communication method of Example 48, comprising selecting a first antenna pattern for application in conjunction with transmissions of the plurality of phased array antennas during a first one of the plurality of training subfields, and selecting a second antenna pattern for application in conjunction with transmissions of the plurality of phased array antennas during a second one of the plurality of training subfields, the second antenna pattern to differ from the first antenna pattern.

Example 50 is the wireless communication method of any of Examples 48 to 49, the TRN field to comprise the plurality of training subfields and a channel estimation (CE) field.

Example 51 is the wireless communication method of Example 50, comprising generating a second plurality of Golay sequence chains, each of the second plurality of Golay sequence chains to be encoded for transmission by a respective one of the plurality of phased array antennas of the STA during the CE field, each of the second plurality of Golay sequence chains to be structured such that it is orthogonal to each other one of the second plurality of Golay sequence chains.

Example 52 is the wireless communication method of Example 51, each of the second plurality of Golay sequence chains to comprise a respective set of eight Golay sequences.

Example 53 is the wireless communication method of any of Examples 51 to 52, each Golay sequence in each of the second plurality of Golay sequence chains to comprise a length of 128 symbols.

Example 54 is the wireless communication method of any of Examples 51 to 53, a respective type of each Golay sequence in each of the second plurality of Golay sequence chains to comprise a type Ga or a type Gb.

Example 55 is the wireless communication method of any of Examples 42 to 54, the beamforming refinement packet to include an automatic gain control (AGC) field.

Example 56 is the wireless communication method of any of Examples 42 to 55, the beamforming refinement packet to include a short training field (STF).

Example 57 is the wireless communication method of any of Examples 42 to 56, the beamforming refinement packet to include a channel estimation (CE) field.

Example 58 is the wireless communication method of any of Examples 42 to 57, the beamforming refinement packet to include a header and a data field.

Example 59 is the wireless communication method of any of Examples 42 to 58, comprising generating the beamforming refinement packet for transmission during a beam refinement phase of a beamforming training process.

Example 60 is the wireless communication method of Example 59, the beamforming training process to comprise an Institute of Electrical and Electronics Engineers (IEEE) 802.11ad-2012 beamforming process or an IEEE 802.11ay beamforming process.

Example 61 is at least one non-transitory computer-readable storage medium comprising a set of instructions that, in response to being executed on a computing device, cause the computing device to perform a wireless communication method according to any of Examples 42 to 60.

Example 62 is an apparatus, comprising means for performing a wireless communication method according to any of Examples 42 to 60.

Example 63 is a system, comprising the apparatus of Example 62, and at least one radio frequency (RF) transceiver.

Example 64 is the system of Example 63, comprising at least one processor.

Example 65 is the system of any of Examples 63 to 64, comprising at least one RF antenna.

Example 66 is a wireless communication apparatus, comprising means for generating a plurality of Golay sequence chains, each of the plurality of Golay sequence chains to be encoded for transmission by a respective one of a plurality of phased array antennas of a station (STA) during a training subfield of a beamforming refinement packet, each of the plurality of Golay sequence chains to be structured such that it is orthogonal to each other one of the plurality of Golay sequence chains.

Example 67 is the wireless communication apparatus of Example 66, each of the plurality of Golay sequence chains to comprise a respective set of four Golay sequences.

Example 68 is the wireless communication apparatus of any of Examples 66 to 67, each Golay sequence in each of the plurality of Golay sequence chains to comprise a length of 128 symbols.

Example 69 is the wireless communication apparatus of any of Examples 66 to 68, a respective type of each Golay sequence in each of the plurality of Golay sequence chains to comprise a type Ga or a type Gb.

Example 70 is the wireless communication apparatus of any of Examples 66 to 69, each of the plurality of Golay sequence chains to correspond to a respective row of a matrix comprising the product of a Golay sequence vector and a unitary matrix comprised of unit amplitude elements.

Example 71 is the wireless communication apparatus of any of Examples 66 to 70, the plurality of Golay sequence chains to comprise four Golay sequence chains, the plurality of phased array antennas to comprise four phased array antennas.

Example 72 is the wireless communication apparatus of any of Examples 66 to 71, each of the plurality of Golay sequence chains to be encoded for transmission by a respective one of the plurality of phased array antennas of the STA during each of a plurality of training subfields of a training (TRN) field of the beamforming refinement packet.

Example 73 is the wireless communication apparatus of Example 72, comprising means for selecting a first antenna pattern for application in conjunction with transmissions of the plurality of phased array antennas during a first one of the plurality of training subfields, and means for selecting a second antenna pattern for application in conjunction with transmissions of the plurality of phased array antennas during a second one of the plurality of training subfields, the second antenna pattern to differ from the first antenna pattern.

Example 74 is the wireless communication apparatus of any of Examples 72 to 73, the TRN field to comprise the plurality of training subfields and a channel estimation (CE) field.

Example 75 is the wireless communication apparatus of Example 74, comprising means for generating a second plurality of Golay sequence chains, each of the second plurality of Golay sequence chains to be encoded for transmission by a respective one of the plurality of phased array antennas of the STA during the CE field, each of the second plurality of Golay sequence chains to be structured such that it is orthogonal to each other one of the second plurality of Golay sequence chains.

Example 76 is the wireless communication apparatus of Example 75, each of the second plurality of Golay sequence chains to comprise a respective set of eight Golay sequences.

Example 77 is the wireless communication apparatus of any of Examples 75 to 76, each Golay sequence in each of the second plurality of Golay sequence chains to comprise a length of 128 symbols.

Example 78 is the wireless communication apparatus of any of Examples 75 to 77, a respective type of each Golay sequence in each of the second plurality of Golay sequence chains to comprise a type Ga or a type Gb.

Example 79 is the wireless communication apparatus of any of Examples 66 to 78, the beamforming refinement packet to include an automatic gain control (AGC) field.

Example 80 is the wireless communication apparatus of any of Examples 66 to 79, the beamforming refinement packet to include a short training field (STF).

Example 81 is the wireless communication apparatus of any of Examples 66 to 80, the beamforming refinement packet to include a channel estimation (CE) field.

Example 82 is the wireless communication apparatus of any of Examples 66 to 81, the beamforming refinement packet to include a header and a data field.

Example 83 is the wireless communication apparatus of any of Examples 66 to 82, comprising means for generating the beamforming refinement packet for transmission during a beam refinement phase of a beamforming training process.

Example 84 is the wireless communication apparatus of Example 83, the beamforming training process to comprise an Institute of Electrical and Electronics Engineers (IEEE) 802.11ad-2012 beamforming process or an IEEE 802.11ay beamforming process.

Example 85 is a system, comprising a wireless communication apparatus according to any of Examples 66 to 84, and at least one radio frequency (RF) transceiver.

Example 86 is the system of Example 85, comprising at least one processor.

Example 87 is the system of any of Examples 85 to 86, comprising at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a medium access control (MAC) circuit; and
a physical layer (PHY) processing circuit coupled with the MAC circuit to generate a beamforming refinement packet (BRP) for transmission, the BRP comprising a preamble and a data field followed by a training (TRN) field, wherein the preamble comprises a short training field (STF) and a channel estimation field (CEF) followed by a header field, the TRN field to comprise a plurality of TRN units, the plurality of TRN units to comprise two or more orthogonal sets of Golay sequences, each TRN unit to comprise repetitions of a TRN subfield, the TRN subfield to comprise one set of the two or more orthogonal sets of Golay sequences.

2. The apparatus of claim 1, wherein the BRP comprises a BRP-Receive (BRP-RX) packet.

3. The apparatus of claim 1, wherein the BRP comprises a BRP-Transmit (BRP-TX) packet.

4. The apparatus of claim 1, each set of Golay sequences to comprise a length of 128 symbols.

5. The apparatus of claim 1, each set of Golay sequences to comprise complementary pairs of Ga and Gb Golay sequences.

6. The apparatus of claim 1, the orthogonal sets of Golay sequences to correspond to products of a set of Golay sequences and a matrix comprised of unit amplitude elements.

7. The apparatus of claim 1, further comprising a radio interface coupled with the PHY processing circuit.

8. The apparatus of claim 7, further comprising a plurality of antennas coupled with the radio interface, each orthogonal set of Golay sequences to transmit via one of the plurality of antennas.

9. At least one non-transitory computer-readable storage medium comprising a set of instructions, the instructions, when executed by the processing circuitry of a station (STA), the instructions to cause the STA to:
generate a beamforming refinement packet (BRP) for transmission, the BRP comprising a preamble and a data field followed by a training (TRN) field, wherein the preamble comprises a short training field (STF) and a channel estimation field (CEF) followed by a header field, the TRN field to comprise a plurality of TRN units, the plurality of TRN units to comprise two or more orthogonal sets of Golay sequences, each TRN unit to comprise repetitions of a TRN subfield, the TRN subfield to comprise one set of the two or more orthogonal sets of Golay sequences.

10. The at least one non-transitory computer-readable storage medium of claim 9, wherein the BRP comprises a BRP-Receive (BRP-RX) packet.

11. The at least one non-transitory computer-readable storage medium of claim 9, wherein the BRP comprises a BRP-Transmit (BRP-TX) packet.

12. The at least one non-transitory computer-readable storage medium of claim 9, each set of Golay sequences to comprise a length of 128 symbols.

13. The at least one non-transitory computer-readable storage medium of claim 9, each set of Golay sequences to comprise complementary pairs of Ga or Gb Golay sequences.

14. The at least one non-transitory computer-readable storage medium of claim 9, the orthogonal sets of Golay sequences to correspond to products of a set of Golay sequences and a matrix comprised of unit amplitude elements.

15. The at least one non-transitory computer-readable storage medium of claim 14, each orthogonal set of Golay sequences to transmit via one of a plurality of antennas of a station.

16. A method comprising:
   generating, by a processing circuitry, a beamforming refinement packet (BRP) for transmission, the BRP comprising a preamble and a data field followed by a training (TRN) field, wherein the preamble comprises a short training field (STF) and a channel estimation field (CEF) followed by a header field, the TRN field to comprise a plurality of TRN units, the plurality of TRN units to comprise two or more orthogonal sets of Golay sequences, each TRN unit to comprise repetitions of a TRN subfield, the TRN subfield to comprise one set of the two or more orthogonal sets of Golay sequences; and
   causing, by a processing circuitry, the BRP to transmit via a plurality of antennas.

17. The method of claim 16, wherein the BRP comprises a BRP-Receive (BRP-RX) packet.

18. The method of claim 16, wherein the BRP comprises a BRP-Transmit (BRP-TX) packet.

19. The method of claim 16, each set of Golay sequences to comprise a length of 128 symbols.

20. The method of claim 16, each set of Golay sequences to comprise complementary pairs of Ga and Gb Golay sequences.

21. The method of claim 16, the orthogonal sets of Golay sequences to correspond to products of a set of Golay sequences and a matrix comprised of unit amplitude elements.

22. The method of claim 21, each orthogonal set of Golay sequences to transmit via one of the plurality of antennas.

* * * * *